United States Patent [19]
Cavestri

[11] Patent Number: 6,101,867
[45] Date of Patent: Aug. 15, 2000

[54] DYE CONCENTRATE

[75] Inventor: Richard C. Cavestri, Columbus, Ohio

[73] Assignee: Bright Solutions, Inc., Troy, Mich.

[21] Appl. No.: 09/065,007

[22] Filed: Apr. 23, 1998

Related U.S. Application Data

[63] Continuation-in-part of application No. 09/019,340, Feb. 5, 1998.

[51] Int. Cl.[7] .................................................. G01M 3/20
[52] U.S. Cl. ...................... 73/40.7; 252/301.16; 252/964
[58] Field of Search ............................... 73/40.7, 40.5 R; 62/77, 125; 252/68, 301.16, 964

[56] References Cited

U.S. PATENT DOCUMENTS

| | | |
|---|---|---|
| 1,279,679 | 9/1918 | Fear . |
| 1,800,693 | 4/1931 | Major . |
| 1,915,965 | 6/1933 | Williams . |
| 1,935,901 | 11/1933 | Augenblick . |
| 2,096,099 | 10/1937 | Gaugler .......................... 73/40 |
| 2,260,608 | 10/1941 | Cormack . |
| 2,341,430 | 2/1944 | Elsey . |
| 2,428,426 | 10/1947 | Lindsay . |
| 2,506,806 | 5/1950 | Metzger . |
| 2,526,938 | 10/1950 | Davis et al. . |
| 2,579,053 | 12/1951 | Schulstadt . |
| 2,682,857 | 7/1954 | Reissmann . |
| 2,757,632 | 8/1956 | Wittlin . |
| 2,918,033 | 12/1959 | Snyder . |
| 2,918,893 | 12/1959 | Norton . |
| 2,994,295 | 8/1961 | Newcum . |
| 3,006,861 | 10/1961 | Browning et al. .......................... 252/408 |
| 3,027,754 | 4/1962 | Alquist et al. .......................... 73/40.7 |
| 3,118,463 | 1/1964 | Lacart . |
| 3,121,615 | 2/1964 | Price . |
| 3,225,554 | 12/1965 | Alexander . |
| 3,234,045 | 2/1966 | Larsen . |
| 3,323,350 | 6/1967 | Roberts . |
| 3,361,547 | 1/1968 | Packo . |
| 3,370,013 | 2/1968 | Labac .......................... 252/68 |
| 3,476,500 | 11/1969 | Litke . |
| 3,572,085 | 3/1971 | Packo . |
| 3,770,640 | 11/1973 | Bartlett . |
| 3,774,022 | 11/1973 | Dubrow et al. . |
| 3,785,164 | 1/1974 | Wrenn, Jr. . |
| 3,838,578 | 10/1974 | Sakasegawa et al. . |
| 3,876,378 | 4/1975 | Montagnon . |
| 3,898,172 | 8/1975 | Reif et al. . |
| 3,960,001 | 6/1976 | Hayes .......................... 73/40.7 |
| 4,046,507 | 9/1977 | Zweifel et al. . |
| 4,072,615 | 2/1978 | McConnell . |
| 4,109,487 | 8/1978 | Carr . |
| 4,170,564 | 10/1979 | Brendle . |
| 4,176,205 | 11/1979 | Molina . |
| 4,187,798 | 2/1980 | Yoshimura . |
| 4,249,412 | 2/1981 | Townsend, III . |
| 4,272,264 | 6/1981 | Cullen et al. . |
| 4,288,402 | 9/1981 | Ellis . |
| 4,348,235 | 9/1982 | Lasswell et al. . |
| 4,369,120 | 1/1983 | Stelz et al. . |
| 4,382,679 | 5/1983 | Lee . |
| 4,436,641 | 3/1984 | Stelz et al. . |
| 4,487,707 | 12/1984 | Holzknecht . |
| 4,513,578 | 4/1985 | Proctor et al. . |
| 4,612,798 | 9/1986 | Roberts . |
| 4,662,940 | 5/1987 | Monier . |
| 4,688,388 | 8/1987 | Lower et al. . |
| 4,690,689 | 9/1987 | Malcosky et al. . |
| 4,693,118 | 9/1987 | Roberts . |
| 4,745,772 | 5/1988 | Ferris . |
| 4,758,366 | 7/1988 | Parekh ...................... 252/68 |
| 4,784,959 | 11/1988 | Wegrzyn . |
| 4,822,743 | 4/1989 | Wegrzyn . |
| 4,862,698 | 9/1989 | Morgan et al. . |
| 4,897,551 | 1/1990 | Gersh et al. . |
| 4,909,806 | 3/1990 | Garbe . |
| 4,938,031 | 7/1990 | Manz et al. . |
| 4,938,063 | 7/1990 | Leighley ................... 73/40.7 |
| 5,022,902 | 6/1991 | Juhl et al. . |
| 5,071,993 | 12/1991 | Leppard et al. . |
| 5,152,926 | 10/1992 | Brown .................... 252/32.5 |
| 5,167,140 | 12/1992 | Cooper et al. ........... 73/40.7 |
| 5,167,867 | 12/1992 | Quaife et al. . |
| 5,251,453 | 10/1993 | Stanke et al. . |
| 5,272,882 | 12/1993 | Degier et al. . |
| 5,301,537 | 4/1994 | Atkinson . |
| 5,357,782 | 10/1994 | Henry ....................... 73/40.7 |
| 5,396,774 | 3/1995 | Hubbell, Jr. . |
| 5,421,192 | 6/1995 | Henry ....................... 73/40.7 |
| 5,440,919 | 8/1995 | Cooper ..................... 73/40.7 |
| 5,558,808 | 9/1996 | Smith et al. . |
| 5,650,563 | 7/1997 | Cooper et al. ........... 73/40.7 |
| 5,681,984 | 10/1997 | Cavestri ................... 73/40.7 |

FOREIGN PATENT DOCUMENTS 1199675  7/1970  United Kingdom .

OTHER PUBLICATIONS

Davis, Don't Lose Your Cool Over Refrigerant Leaks, Air Conditioning, Heating & Refrigeration News p. 10, May 2, 1994.

Davis, Pinpointing HFC–134a Leaks is Easy if You Use the Proper Equipment, Air Coditioning, Heating & Refrigeration News, p. 36, Dec. 7, 1992.

Davis, Pinpointing Vehicle Leaks Faster with Ultraviolet Light, Materials Evaluation 47:1248–1250, 1989.

Felmeister, Powders Particle Size Reduction, Classification, and Measurement—Mixing of Powders—Powders as a Dosage Form, Remington's Pharmaceutical Sciences, 14th ed., Chapter 86, pp. 1626–1648.

Marrano, Fluorescent Tracer Additives as a Nondestructive Inspection Technique for Leak Testing, Materials Evaluation 51:436–438, 1993.

The Spectroline, vol. 1, No. 1, HVAC Edition, Spring 1991.

*Primary Examiner*—Daniel S. Larkin
*Attorney, Agent, or Firm*—Pillsbury Madison & Sutro Intellectual Property Group

[57] ABSTRACT

A dye concentrate for introducing a leak detection dye into a climate control system is described. The dye concentrate is a mixture of a lubricant and at least 40 weight percent of a leak detection dye. The dye concentrate can be thixotropic, a paste, or a suspension. The dye concentrate can be inserted into appropriate locations within the climate control system.

80 Claims, No Drawings

DYE CONCENTRATE

CROSS-REFERENCE TO RELATED APPLICATIONS

This is a continuation-in-part of copending U.S. Ser. No. 09/019,340, filed Feb. 5, 1998.

BACKGROUND OF THE INVENTION

The invention relates to a dye concentrate for introducing a leak detection dye into a climate control system.

Leak detection methods have been developed to analyze fluid systems, such as climate control systems such as heating, cooling, ventilating, and air conditioning systems, hydraulics, engine oil systems, automatic transmission systems, fuel systems, brake systems, or radiator coolant systems, using dyes. Some methods employ emissive substances, such as, for example, fluorescent or phosphorescent dyes that are added to the refrigerants and/or lubricants of a climate control system.

Leaks can be detected by observing fluorescence of the dye at leak sites resulting from excitation of the dye with a light source having particular illumination characteristics, such as illumination wavelength or intensity. Suitable light sources for use in fluorescence detection emit light of wavelengths suitable to excite the dye and cause light emission from the dye, which is at a greater wavelength than excitation wavelength. In general, the dyes fluoresce brightly when excited by light in the 190 to 700 nanometer wavelength range. A variety of systems have been developed to introduce a leak detection dyes into air conditioning systems, including injectors that place solvent-based solutions containing the dye into an operational air conditioning system.

SUMMARY OF THE INVENTION

In general, the invention features a dye concentrate for introducing a leak detection dye into a climate control system. The dye concentrate can be inserted into a climate control system or a system component during assembly of the system. The dye concentrate has a high weight percentage of dye, which can reduce the total amount of material that is introduced into the system.

In one aspect, the invention features a dye concentrate. The dye concentrate can include a lubricant and at least 3 weight percent of a leak detection dye. Preferably, the dye concentrate includes at least 5 weight percent of a leak detection dye.

The dye concentrate can have a viscosity of at least 10 cP, preferably at least 500 cP, more preferably at least 3,000 cP, even more preferably at least 10,000 cP, even more preferably at least 100,000 cP, and most preferably at least 500,000 cP. The dye concentrate can have a viscosity of between about 1 million cP and 4 million cP. Generally, a Brookfield RVT viscometer can be used for this measurement under conditions in which the dye concentrate exhibited fluid like behavior.

The dye concentrate can be thixotropic or semi-solid. A semi-solid concentrate is a deformable concentrate, such as a paste or gel. The dye concentrate can be a suspension of dye particles in the lubricant.

The leak detection dye can include a plurality of particles. The plurality of particles can be suspended in the lubricant. The plurality of particles has a distribution of particle sizes. Greater than 60 percent of the particles can have a particle size of less than 40 microns. Preferably, greater than 80 percent of the particles have a particle size of less than 40 microns. Greater than 10 percent of the particles have a particle size of less than 5 microns. Preferably, greater than 40 percent of the particles have a particle size of less than 5 microns. More preferably, greater than 50 percent (e.g., greater than 60 percent) of the particles have a particle size of less than 5 microns. In preferred embodiments, greater than 80 percent of the particles have a particle size of less than 5 microns. In other embodiments, greater than 5 percent of the particles have a particle size of less than 10 microns, or greater than 20 percent of the particles have a particle size of less than 20 microns.

The dye concentrate can consist essentially of a lubricant and at least 3 weight percent of a leak detection dye.

Preferably, the concentrate includes at least 10 weight percent of the leak detection dye, more preferably at least 25 weight percent of the leak detection dye, and even more preferably at least 40 weight percent of the leak detection dye.

In preferred embodiments, the dye concentrate includes at least 50 weight percent of the leak detection dye. The dye concentrate can include at least 60 weight percent or at least 70 weight percent of the leak detection dye.

In another aspect, the invention features a method of manufacturing a dye concentrate. The method includes combining a lubricant and a leak detection dye to form a mixture, and mixing the mixture to form a suspension or a semi-solid material. The leak detection dye includes a plurality of particles which are suspended in the lubricant. Greater than 60 percent of the particles have a particle size of less than 40 microns. Mixing can include high shear mixing.

In another aspect, the invention features a method of introducing a leak detection dye in a climate control system, an engine oil system, an automatic transmission system, a fuel system, a brake system, or a radiator coolant system. The method can include placing a dye concentrate in a component of the climate control system. Placing the dye concentrate in a component can include, for example, depositing the dye concentrate onto an inside or outside surface of the component or inserting the dye concentrate into the interior of the component. The method can include assembling the climate control system including the component. In other embodiments, the dye concentrate is placed in a component of an assembled climate-control system, for example, by injection.

The climate control system can be a mobile, stationary, window air conditioning system such as an automotive, portable, residential, or commercial air conditioning system, or any other hermetic system that employing a refrigerant and lubricant. The system can include a refrigerant. The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. The system can also include a lubricant. The refrigerant, lubricant, or refrigerant-lubricant mixture can dissolve the leak detection dye and distribute it throughout the system. The leak detection dye is soluble in the refrigerant, or combinations of the refrigerant and lubricant.

The dye concentrate can be placed in a climate control system or a component of a climate control system. The concentrate can be placed in or on a portion of a component of the system. In an air conditioning system, the component can be a liquid line receiver, a receiver drier, a filter drier, an accumulator, a compressor, a condenser, a high pressure discharge line, a discharge muffler, a liquid line heat exchanger, a filter pad, filter media, an expansion device (e.g., an expansion valve or orifice tube), a suction line, a suction muffler, an orifice tube, a hose line, an expansion valve, a fitting assembly, a filter assembly, or an evaporator.

A dye concentrate, including the leak detection dye and lubricant, can have a sufficiently high viscosity to allow it to be placed directly onto the system or a component of the system without dripping or otherwise running off of the component. For example, the concentrate can be thixotropic or semi-solid. A semi-solid concentrate is a deformable concentrate, such as a paste or gel.

Introducing a leak detection dye as a dye concentrate during the assembly of the climate control system can enable the system to be tested for leaks to provide a quality assurance tool prior to shipment of the system. It can also facilitate checking the system for leaks at a later time in the field without charging the system with additional leak detection dye. The dye concentrate can provide a simple way to insert dyes into, for example, an air conditioning system rapidly and cleanly, without needing to charge the system with refrigerant at the time of dye insertion. Installation during assembly also allows manufacturers to test products on site, permitting the rapid identification of leaks.

Insertion location, concentrate properties, and dye properties can be selected to improve cost, ease of insertion, cleanliness of handling, capital equipment costs, material waste, environmental impact, shelf life prior to insertion in the system, and chemical life once introduced into the system. The concentrate can be substantially compatible with known systems because the composition can include only the lubricant and the leak detection dye.

The dye concentrate is easy to handle and use. Because the dye concentrate carries a high weight percentage of the dye, use of the concentrate can reduce the risk of contaminating the work environment with the dye, which can lead to erroneous leak detection. In addition, the concentrate dissolves completely in a mixture of lubricant and refrigerant. The dye concentrate can be essentially solvent-free and can be substantially free of impurities that could otherwise damage a climate control system. The concentrate can consist essentially of the leak detection dye and the lubricant. Small amounts of other additives such as surfactants (e.g., siloxanes) can be included in the concentrate.

Additional features and advantages of the invention will become apparent from the detailed description of the preferred embodiments of the invention.

DESCRIPTION OF THE PREFERRED EMBODIMENTS

A dye concentrate includes a leak detection dye and a lubricant. Preferably, the dye concentrate can consist essentially of the leak detection dye and the lubricant. The concentrate can be characterized as a paste or suspension of dye in the lubricant.

A suitable lubricant can include a polyalkylene glycol, a polyolester, a mineral oil, a polyvinyl ether, an alkylbenzene, or another synthetic lubricating material. Suitable polyalkylene glycol or polyol ester lubricants include, for example, Emery 2927a, Mobil Arctic EAL 68, Union Carbide UCON 488 Refrigeration Lubricant, Union Carbide UCON MLX-1197 Experimental Lubricant, Union Carbide 50-HB5100, Motorcraft YN-12B, Ford PAG, Chrysler PAG, or any other automotive PAG. UCON 488 is a polyalkylene glycol having a viscosity of about 133 centistokes at 40° C. Union Carbide 50-HB5100 is a polyalkylene glycol having a viscosity of about 1020 centistokes at 40° C. Motorcraft YN-12B is a polyalkylene glycol having a viscosity of about 56 centistokes at 40° C. The viscosity of the lubricant can affect the viscosity of the dye concentrate.

The leak detection dye can include a naphthalimide, a perylene, a coumarin, a thioxanthane, a fluorescein or a derivative thereof, or other dye compatible with a climate control system.

Several techniques are available for preparing the dye concentrate. Generally, particles of the leak detection dye are combined with the lubricant to form a mixture. The mixture is then processed to form a suspension or a paste from the mixture. The particles are ultimately suspended or dispersed in the lubricant by mechanical means. The process involves steps that thoroughly mix the two components of the concentrate while decreasing the particle size of the dye. For example, the mixture can be subjected to high shear mixing conditions in an impeller mill or blender such as an emulsifier or a homogenizer. Other mills that can be used to disperse the solid dye particles in the lubricant include ball mills, stirred media mills, vibratory mills, multiple roll mills (e.g., a three roll mill or a five roll mill), or ultrasonic mills.

The mechanical mills can reduce the particle sizes of the dye during the mixing process. The smaller particle sizes can lead to more stable suspensions. The smaller particles can be re-dispersed readily in the lubricant by agitation.

The particle size distribution of the dye powder can be reduced prior to mixing the dye with the lubricant. The particle size reduction can be achieved using, for example, a crusher, pulverizer, grinding mill, attrition mill, ball mill, sand mill, bead mill, chaser mill, jar mill, hammer mill, impact grinding mill, air jet mill, or micronizer. For example, dye powders can be processed by methods described in "Remington's Pharmaceutical Sciences," 14th Edition, Mack Publishing Co., 1970, which is incorporated herein by reference.

The dye concentrate can be a suspension, paste, or semi-solid material. The dye concentrate can be thixotropic.

The dye concentrate can be placed into an air conditioning system. In particular, the concentrate can be placed on the inside or outside of a component of an air conditioning system. The concentrate can be dispensed into the system by, for example, a syringe or other metering device. The concentrate can have a thickness or viscosity sufficient to prevent dripping of the dye from the component after it is dispensed. The concentrate can contain a high proportion of leak detection dye.

The location for placement of the concentrate in the system can be selected to increase the dissolution rate of the concentrate. For example, components that have a greater flow of refrigerant or a greater flow of lubricant can be selected to provide more rapid dissolution rates. Similarly, components that contain the refrigerant or the lubricant at higher temperatures can be selected to provide more rapid dissolution rates.

Suitable locations for placement of a dye concentrate in an air conditioning system can include a liquid line receiver, an accumulator, a receiver dryer, a filter drier, a liquid line heat exchanger, a filter pad, filter media, a compressor, a condenser, a high pressure discharge line, a discharge muffler, an orifice tube, a suction line, a hose line, a expansion valve, a fitting assembly, an access fitting, a charging port, a reservoir, or an evaporator. The dye concentrate need not be immobilized in the system. The dye concentrate can be adsorbed onto a material. Each of the suitable locations can provide a desired dissolution rate of the dye concentrate. For example, suitable locations can have higher operating temperatures than other locations, leading to more rapid dissolution of the concentrate.

After placing the concentrate into an air conditioning system, the system is operated to circulate the refrigerant and lubricant. The circulating refrigerant, lubricant, or refrigerant-lubricant mixture dissolves the leak detection dye, dispersing it throughout the system. Once dissolved, the dye content of the system can be below about 0.1 percent. After the dye has been allowed to circulate within the system, system components, joints, fittings, or attachments can be examined for leaks with a light source having a light emission wavelength from 190 nanometers to 700 nanometers. The presence of a leak can be determined by the presence of a colored visual indication, such as fluorescence or other emission, that can be detected after excitation with the light from the light source.

The following examples are illustrative, but not limitive, of the invention.

EXAMPLES

A number of concentrates were prepared by mixing powdered leak detection dye with a lubricant. In Examples 1–6, the concentrates were prepared by homogenization of the mixture using a mixer/emulsifier. In Examples 7–11, the concentrates were prepared by mixing followed by roll milling. The viscosities and particle size distributions of the concentrates were also examined.

Examples 1–6

Solvent Yellow 43 dye powder (CAS 19125-99-6) was combined with a lubricant at dye concentrations of 40 weight percent, 50 weight percent, and 60 weight percent to form a mixture. The lubricants used to prepare these concentrates were UCON 488 Refrigeration Lubricant, UCON MLX-1197 Experimental Lubricant, and Motorcraft YN-12B Refrigerant Compressor Oil. 200 grams of dye powder and 300 grams of lubricant were combined to form the 40 weight percent mixture; 300 grams of dye powder and 300 grams of lubricant were combined to form the 50 weight percent mixture; and 300 grams of dye powder and 200 grams of lubricant were combined to form the 60 weight percent mixture.

Each mixture was processed using a Ross Mixing ME 100LC Model laboratory mixer/emulsifier (Charles Ross & Son Company, Hauppauge, N.Y.). Processing was carried out by agitation using the highest shear mixing blade. Processing times were dependent on dye concentration. The 40 weight percent mixtures were agitated for 30 minutes, the 50 weight percent mixtures were agitated for 60 minutes, and the 60 weight percent mixtures were agitated for 90 minutes. The mixer speed was adjusted to create a vortex which just exposed the top of the mixing blade which did not splash material out of the mixing vessel. The mixer speed increased with dye concentration and was generally between about 2000 and 4000 rpm. The concentrate formed by the process was a suspension of dye in the lubricant. Compositions of particular examples of concentrates prepared using the mixer/emulsifier are shown in Table I.

TABLE I

| Example | Lubricant Type | Wt % Lubricant | Wt % Dye | Type |
| --- | --- | --- | --- | --- |
| 1 | UCON MLX-1197 | 50 | 50 | Suspension |
| 2 | UCON MLX-1197 | 40 | 60 | Suspension |
| 3 | UCON 488 | 50 | 50 | Suspension |
| 4 | UCON 488 | 40 | 60 | Suspension |
| 5 | MOTORCRAFT YN-12B | 50 | 50 | Suspension |
| 6 | MOTORCRAFT YN-12B | 60 | 40 | Suspension |

In general, the concentrates prepared by homogenization thickened and remained in suspension longer with increased dye concentration. The 40 weight percent concentrate remained in suspension for about 1–2 days, the 50 weight percent and 60 weight percent concentrates remained in suspension for about 3–5 days. After about 3–5 days, a layer of lubricant was observed at the top of the concentrate. The dye was easily resuspended by manual agitation. Examples 5 and 6 appeared to be more viscous than Examples 1–4.

Examples 7–11

The formulations of Examples 7–11 were prepared by combining Solvent Yellow 43 dye powder with a lubricant at dye concentrations of 60 weight percent and 70 weight percent to form a mixture. The lubricants used to prepare these concentrates were UCON 488 Refrigeration Lubricant and 50-HB5100 from Union Carbide. The concentrate of Example 7 was prepared in a 2 pound batch; the concentrates of Examples 8–11 were prepared in 6 pound batches. Compositions of particular examples of concentrates prepared by mixing followed by roll milling are shown in Table II.

TABLE II

| Example | Lubricant Type | Wt % Lubricant | Wt % Dye | Type |
| --- | --- | --- | --- | --- |
| 7 | 50-HB5100 | 30 | 70 | Paste |
| 8 | 50-HB5100 | 40 | 60 | Paste |
| 9 | 50-HB5100 | 40 | 60 | Paste |
| 10 | UCON 488 | 30 | 70 | Paste |
| 11 | UCON 488 | 40 | 60 | Paste |

Example 7 was mixed by hand until relatively homogenous. The material was then passed twice through a Ross Three Roll Mill (Charles Ross & Son Company, Hauppauge, N.Y.). The material was a smooth paste showing excellent dispersion when a piece of material was pressed between two glass slides.

Example 8 was mixed in a Ross LDM 2 gallon Planetary Mixer (Charles Ross & Son Company, Hauppauge, N.Y.) and subjected to a vacuum of about 29.8 inches of Hg at a mixing speed of about 78 rpm for about ten minutes. The material was then passed through a Ross Three Roll Mill. Six pounds of material passed through the mill in 15 minutes.

Example 9 was a portion of Example 8 that was passed through the Ross Three Roll Mill a second time.

Example 10 was mixed in a Ross LDM 2 gallon Planetary Mixer and subjected to a vacuum of about 29.8 inches of Hg at a mixing speed of about 48 rpm for about ten minutes. The material was then passed twice through a Ross Three Roll Mill.

Example 11 was mixed in a Ross LDM 2 gallon Planetary Mixer and was subjected to a vacuum of about 29.8 inches of Hg at a mixing speed of about 72 rpm for about ten minutes. The material was then passed once through a Ross Three Roll Mill.

The resulting concentrates were paste-like materials.

The viscosities and particle size distributions in the concentrates of Examples 1–11 were examined. The viscosities were measured with a Brookfield RVT viscometer. T-bar spindles with a Helipath stand were used to measure viscosities of the semi-solid samples; a rotation rate (i.e., 1 RPM) was used for this measurement at which the semi-solid sample exhibited fluid behavior at low shear stress. Standard spindles were used for the liquid samples. The sample viscosities are listed in Table III.

TABLE III

| Example | Spindle | RPM | Dial Reading | Multiplier | Viscosity |
|---|---|---|---|---|---|
| 1 | #5 | 20 | 76.5 | 50 | 3825 cP |
| 2 | #5 | 20 | 31 | 200 | 6200 cP |
| 3 | #5 | 20 | 28–28.5 | 200 | 5600–5700 cP |
| 4 | #5 | 20 | 82–85 | 200 | 16400–17000 cP |
| 5 | #5 | 20 | 19.5 | 200 | 3900 cP |
| 6 | TF | 20 | 15.5 | 2000K | 31000 KcP |
| 7 | TF | 1 | 19–21 | 100K | 1900–2100 KcP |
| 8 | TF | 1 | 14.5–15 | 100K | 1450–1500 KcP |
| 9 | TF | 1 | 32 (35–20) | 100K | 3200 KcP |
| 10 | TF | 1 | 29.5 | 100K | 2950 KcP |
| 11 | TF | 1 | 20.5 | 100K | 2050 KcP |

The viscosity of the concentrate prepared by roll milling was higher than the homogenized material. The viscosity of the concentrate increased when the material was passed through the mill a second time. The viscosity generally increased as the dye content of the concentrate increased.

The particle size distributions were determined by ocular examination of a series of slides on which the samples were smeared. The slides were photographed at 400 times magnification. The photographs were placed under a calibrated grid. The size and number of particles were tabulated. The particle size distributions are listed in Table IV.

TABLE IV

| Example | 1–5 micron | 5–10 micron | 10–20 micron | 20–40 micron | 40+ micron |
|---|---|---|---|---|---|
| 1 | 51% | 9% | 24% | 6% | 9% |
| 2 | 18% |  | 74% |  | 7% |
| 3 | 44% |  | 38% | 7% | 11% |
| 4 | 42% | 35% | 13% | 8% | 2% |
| 5 | 54% | 21% | 14% |  | 11% |
| 6 |  | 6% | 23% | 63% | 8% |
| 7 | 85% | 14% | 1% |  |  |
| 8 | 44% | 50% | 6% |  |  |
| 9 | 93% | 7% |  |  |  |
| 10 | 99.7% |  | 0.3% |  |  |
| 11 | 99% |  |  | 1% |  |

In general, roll milling of the concentrate resulted in smaller particle sizes and narrower distributions of particle sizes.

Examples 12–15

Solvent Yellow 43 dye powder (CAS 19125-99-6) was micronized using an air jet mill. The resulting micronized dye powder had a particle size distribution in which all of the particle sizes were less than 11 microns, with an average particle size of 2.17 microns. The micronized dye powder was combined with a lubricant at dye concentrations of 20 weight percent and 3 weight percent to form a mixture. The lubricants used to prepare these concentrates were 50-HB5100 from Union Carbide, an alkylbenzene lubricant having a viscosity of about 10 centistokes at 40° C., a hydrocarbon oil having a viscosity of about 10 centistokes at 40° C., and an Idemitsu PAG having a viscosity of about 44 centistokes at 40° C. The materials were mixed using a mortar and pestle to form a suspension. Compositions of particular examples of concentrates prepared using the micronized dye powder are shown in Table V.

TABLE V

| Example | Lubricant Type | Wt % Lubricant | Wt % Dye | Type |
|---|---|---|---|---|
| 12 | 50-HB5100 | 80 | 20 | Suspension |
| 13 | Idemitsu PAG | 97 | 3 | Suspension |
| 14 | alkylbenzene | 97 | 3 | Suspension |
| 15 | hydrocarbon oil | 97 | 3 | Suspension |

Other embodiments are within the claims. For example, the dye concentrate can be placed on a porous or fibrous material that can adsorb the lubricant from the concentrate, thereby converting the concentrate into a semi-solid dye concentrate.

What is claimed is:

1. A dye concentrate comprising a lubricant and at least 3 weight percent of a leak detection dye, wherein the dye concentrate has a viscosity of at least 500 cP at room temperature, the leak detection dye including a plurality of particles and greater than 60 percent of the particles have a particle size of less than 40 microns.

2. The dye concentrate of claim 1, wherein the dye concentrate includes at least 5 weight percent of the leak detection dye.

3. The dye concentrate of claim 1, wherein the dye concentrate includes at least 10 weight percent of the leak detection dye.

4. The dye concentrate of claim 1, wherein the dye concentrate includes at least 25 weight percent of the leak detection dye.

5. The dye concentrate of claim 1, wherein the dye concentrate includes at least 40 weight percent of the leak detection dye.

6. The dye concentrate of claim 1, wherein the dye concentrate includes at least 60 weight percent of the leak detection dye.

7. The dye concentrate of claim 1, wherein the dye concentrate has a viscosity of at least 3,000 cP at room temperature.

8. The dye concentrate of claim 1, wherein the dye concentrate has a viscosity of at least 100,000 cP at room temperature.

9. The dye concentrate of claim 1, wherein the dye concentrate has a viscosity of at least 500,000 cP at room temperature.

10. The dye concentrate of claim 1, wherein the leak detection dye comprises a naphthalimide, a perylene, a thioxanthane, a coumarin, or a fluorescein.

11. The dye concentrate of claim 1, wherein the plurality of particles are suspended in the lubricant.

12. The dye concentrate of claim 1, wherein greater than 80 percent of the particles have a particle size of less than 40 microns.

13. The dye concentrate of claim 1, wherein greater than 10 percent of the particles have a particle size of less than 5 microns.

14. The dye concentrate of claim 1, wherein greater than 40 percent of the particles have a particle size of less than 5 microns.

15. The dye concentrate of claim 1, wherein the dye concentrate is thixotropic.

16. The dye concentrate of claim 1, wherein the dye concentrate is a paste.

17. The dye concentrate of claim 1, wherein the dye concentrate is a suspension.

18. The dye concentrate of claim 1, further comprising a surfactant.

19. A dye concentrate comprising a lubricant and a leak detection dye, wherein the dye concentrate is a suspension or a semi-solid material, the leak detection dye including a plurality of particles and greater than 60 percent of the particles have a particle size of less than 40 microns.

20. The dye concentrate of claim 19, wherein the dye concentrate is thixotropic.

21. The dye concentrate of claim 19, wherein the dye concentrate is a paste.

22. The dye concentrate of claim 19, wherein the dye concentrate includes at least 3 weight percent of the leak detection dye.

23. The dye concentrate of claim 19, wherein the dye concentrate includes at least 5 weight percent of the leak detection dye.

24. The dye concentrate of claim 19, wherein the dye concentrate includes at least 10 weight percent of the leak detection dye.

25. The dye concentrate of claim 19, wherein the dye concentrate includes at least 25 weight percent of the leak detection dye.

26. The dye concentrate of claim 19, wherein the dye concentrate includes at least 40 weight percent of the leak detection dye.

27. The dye concentrate of claim 19, wherein the dye concentrate includes at least 60 weight percent of the leak detection dye.

28. The dye concentrate of claim 19, wherein the leak detection dye comprises a naphthalimide, a perylene, a thioxanthane, a coumarin, or a fluorescein.

29. The dye concentrate of claim 19, wherein greater than 80 percent of the particles have a particle size of less than 40 microns.

30. The dye concentrate of claim 19, wherein greater than 10 percent of the particles have a particle size of less than 5 microns.

31. The dye concentrate of claim 19, wherein greater than 40 percent of the particles have a particle size of less than 5 microns.

32. The dye concentrate of claim 19, further comprising a surfactant.

33. A dye concentrate comprising a lubricant and a leak detection dye, the leak detection dye including a plurality of particles and the plurality of particles being suspended in the lubricant, wherein greater than 60 percent of the particles have a particle size of less than 40 microns.

34. The dye concentrate of claim 33, wherein the dye concentrate includes at least 3 weight percent of the leak detection dye.

35. The dye concentrate of claim 33, wherein the dye concentrate includes at least 5 weight percent of the leak detection dye.

36. The dye concentrate of claim 33, wherein the dye concentrate includes at least 10 weight percent of the leak detection dye.

37. The dye concentrate of claim 33, wherein the dye concentrate includes at least 25 weight percent of the leak detection dye.

38. The dye concentrate of claim 33, wherein the dye concentrate includes at least 40 weight percent of the leak detection dye.

39. The dye concentrate of claim 33, wherein the dye concentrate includes at least 60 weight percent of the leak detection dye.

40. The dye concentrate of claim 33, wherein the leak detection dye comprises a naphthalimide, a perylene, a thioxanthane, a coumarin, or a fluorescein.

41. The dye concentrate of claim 33, wherein greater than 80 percent of the particles have a particle size of less than 40 microns.

42. The dye concentrate of claim 33, wherein greater than 10 percent of the particles have a particle size of less than 5 microns.

43. The dye concentrate of claim 33, wherein greater than 40 percent of the particles have a particle size of less than 5 microns.

44. The dye concentrate of claim 33, wherein the dye concentrate has a viscosity of at least 500,000 cP at room temperature.

45. A dye concentrate consisting essentially of a lubricant and at least 3 weight percent of a leak detection dye, the leak detection dye including a plurality of particles, wherein greater than 60 percent of the particles have a particle size of less than 40 microns.

46. The dye concentrate of claim 45, wherein the dye concentrate includes at least 5 weight percent of the leak detection dye.

47. The dye concentrate of claim 45, wherein the dye concentrate includes at least 10 weight percent of the leak detection dye.

48. The dye concentrate of claim 45, wherein the dye concentrate includes at least 25 weight percent of the leak detection dye.

49. The dye concentrate of claim 45, wherein the dye concentrate includes at least 40 weight percent of the leak detection dye.

50. The dye concentrate of claim 45, wherein the dye concentrate includes at least 60 weight percent of the leak detection dye.

51. A method of introducing a leak detection dye in a climate control system, the method comprising:
    placing a dye concentrate in a component of the climate control system, the dye concentrate being a dye concentrate according to claim 1, claim 20, claim 35 or claim 47.

52. The method of claim 51, wherein the climate control system is an air conditioning system.

53. The method of claim 52, wherein the component is a liquid line receiver, a receiver drier, a filter drier, an accumulator, a compressor, a condenser, a high pressure discharge line, a discharge muffler, a liquid line heat exchanger, a filter pad, filter media, an expansion device, a suction line, a suction muffler, an orifice tube, a hose line, a expansion valve, a fitting assembly, a filter assembly, an access fitting, a charging port, a reservoir, or an evaporator.

54. The method of claim 51, wherein the leak detection dye comprises a naphthalimide, a perylene, a thioxanthane, a coumarin, or a fluorescein.

55. The method of claim 51, further comprising assembling the climate control system including the component.

56. The method of claim 51, wherein the dye concentrate has a viscosity of at least 100,000 cP at room temperature.

57. The method of claim 51, wherein the dye concentrate is thixotropic.

58. The method of claim 51, wherein the dye concentrate is a paste.

59. The method of claim 51, wherein the dye concentrate is a suspension.

60. The method of claim 51, wherein the climate control system is an assembled climate control system.

61. The method of claim 51, wherein placing includes injecting the concentrate into the assembled climate control system.

62. The method of claim 57, wherein the dye concentrate includes a surfactant.

63. A method of manufacturing a dye concentrate comprising:

combining a lubricant and a leak detection dye, the leak detection dye including a plurality of particles and greater than 60 percent of the particles have a particle size of less than 40 microns, to form a mixture; and mixing the mixture to form a dye concentrate to form a suspension or a semi-solid material.

64. The method of claim 63, wherein mixing comprises high shear mixing.

65. The method of claim 63, wherein the dye concentrate includes at least 5 weight percent of the leak detection dye.

66. The method of claim 63, wherein the dye concentrate includes at least 40 weight percent of the leak detection dye.

67. The method of claim 63, wherein the dye concentrate has a viscosity of at least 500 cP at room temperature.

68. The method of claim 63, wherein the dye concentrate has a viscosity of at least 3,000 cP at room temperature.

69. The method of claim 63, wherein the dye concentrate has a viscosity of at least 100,000 cP at room temperature.

70. The method of claim 63, wherein the leak detection dye comprises a naphthalimide, a perylene, a thioxanthane, a coumarin, or a fluorescein.

71. The method of claim 63, wherein the plurality of particles are suspended in the lubricant.

72. The method of claim 63, wherein greater than 80 percent of the particles have a particle size of less than 20 microns.

73. The method of claim 63, wherein greater than 10 percent of the particles have a particle size of less than 5 microns.

74. The method of claim 63, wherein greater than 40 percent of the particles have a particle size of less than 5 microns.

75. The method of claim 63, wherein the dye concentrate is thixotropic.

76. The method of claim 63, wherein the dye concentrate is a paste.

77. The method of claim 63, wherein the dye concentrate includes a surfactant.

78. A dye concentrate comprising a lubricant and at least 3 weight percent of a leak detection dye, wherein the dye concentrate is a suspension or a semi-solid material, the dye concentrate has a viscosity of at least 10 cP at room temperature, the leak detection dye includes a naphthalimide, a perylene, a thioxanthane, a coumarin, or a fluorescein, and the leak detection dye includes a plurality of particles in which greater than 60 percent of the particles have a particle size of less than 40 microns.

79. A method of introducing a leak detection dye in a climate control system, the method comprising:

placing a dye concentrate in a component of the climate control system, the dye concentrate comprising a lubricant and a leak detection dye, the dye concentrate being a suspension or a semi-solid material, wherein the dye concentrate has a viscosity of at least 100,000 cP at room temperature.

80. A method of introducing a leak detection dye in a climate control system, the method comprising:

placing a dye concentrate in a component of the climate control system, the dye concentrate comprising a lubricant and a leak detection dye, the dye concentrate being a suspension or a semi-solid material, wherein the dye concentrate includes a surfactant.

* * * * *